United States Patent

Yoshida et al.

Patent Number: 5,669,046
Date of Patent: Sep. 16, 1997

[54] TRANSMISSION/COUPLING DEVICE AND IMAGE FORMING APPARATUS HAVING SAME

[75] Inventors: Hiroaki Yoshida; Yukinari Okawa, both of Kawasaki, Japan

[73] Assignee: Fujitsu Limited, Kanagawa, Japan

[21] Appl. No.: 639,927

[22] Filed: Apr. 26, 1996

[30] Foreign Application Priority Data

Jun. 28, 1995 [JP] Japan ................... 7-162165

[51] Int. Cl.$^6$ ................................................. G03G 15/00
[52] U.S. Cl. ................................................. 399/167
[58] Field of Search ........................... 399/167, 116, 399/117; 198/780, 789, 791, 781.07

[56] References Cited

U.S. PATENT DOCUMENTS

| | | | |
|---|---|---|---|
| 4,327,992 | 5/1982 | Babicz | 399/167 |
| 4,530,588 | 7/1985 | Kimura et al. | 399/117 |
| 4,835,582 | 5/1989 | Kasahara et al. | 399/167 |
| 4,839,690 | 6/1989 | Onoda et al. | 399/117 |
| 4,972,227 | 11/1990 | Onoda et al. | 399/116 |
| 5,023,660 | 6/1991 | Ebata et al. | 399/167 X |
| 5,132,728 | 7/1992 | Suzaki et al. | 399/167 |
| 5,151,734 | 9/1992 | Tsuda et al. | 399/117 X |
| 5,402,207 | 3/1995 | Michlin | 399/117 |
| 5,534,972 | 7/1996 | Ohno | 399/116 X |

FOREIGN PATENT DOCUMENTS

| | | | |
|---|---|---|---|
| 1-164818 | 6/1989 | Japan . | |
| 1-196089 | 8/1989 | Japan | 355/213 |

*Primary Examiner*—Matthew S. Smith
*Attorney, Agent, or Firm*—Nikaido Marmelstein Murray & Oram LLP

[57] ABSTRACT

To provide a transmission/coupling device simple in structure and capable of carrying out uniform velocity transmission and quick coupling/decoupling of shafts. A shaft 101 of a photo-sensitive drum 23 has a taper section 103 and a first coupling member 105, mounted on the shaft 101, having a projection 107. An output shaft 111 of a drive motor 67 has a second coupling member 113, mounted on the shaft 111, having a cylindrical bore 115 and a projection 119. When the shafts 101 and 111 are coupled to each other, the taper section 103 is in line-contact with the cylindrical bore 115 to define an engagement circle, and the projections 107 and 119 are engaged with each other to define a power transmission point P which exists in a bisector plane A including the engagement circle, whereby uniform velocity transmission is realized.

7 Claims, 7 Drawing Sheets

TRANSMISSION/COUPLING DEVICE AND IMAGE FORMING APPARATUS HAVING SAME

BACKGROUND OF THE INVENTION

1. Field of the Invention

The present invention relates to a transmission/coupling device and an image forming apparatus having the same.

2. Description of the Related Art

Japanese Unexamined Patent Publication (Kokai) No. 1-164818 discloses a transmission/coupling device used in a copying machine for coupling a photo-sensitive drum with a drive unit thereof. According to this transmission/coupling device, one member (coupling member) has a conical projection on the rotary axis thereof and a pair of engagement pins projected forward from the peripheral area thereof. On the other hand, another member (coupling member) has a conical recess corresponding to the conical projection on the rotary axis and a pair of engagement ribs provided corresponding to the engagement pins. When the coupling members are coupled with each other on the rotary axis, the projection is pushingly engaged with the recess to locate each of the engagement pins between both the engagement ribs. Thus, two power-transmission points are provided.

According to the technology disclosed in the above Patent Publication, since the projection is fit to the recess to be in surface-contact with each other, a tight coupling can be achieved. However, since the positional or angular offset of the axes of both the members is not allowable in this structure, it is necessary to provide a movable coupling member for the purpose of absorbing such an offset. Also, since this technology solely relates to a torque transmission between axes but not to a uniform velocity transmission, there is a risk of positional offset of printed images or colors. That is, it is actually and practically difficult to completely coincide a rotary axis of a photo-sensitive drum of a replaceable type with an output shaft of a drive motor. If the axial offset is present, even if a regular rotation is input, an irregular rotation (non-uniform velocity) is output under such a circumstance.

SUMMARY OF THE INVENTION

Accordingly, an object of the present invention is provide a transmission/coupling device for transmitting not only a torque but also a uniform velocity, which is free from the above-mentioned drawbacks and is capable of being readily and rapidly operable.

To achieve the object, a transmission/coupling device for coupling a pair of objectives is provided according to the present invention, wherein the one objective comprises a taper section extending on the rotary axis thereof and an engagement section and another objective comprises a cylindrical bore section extending on the rotary axis thereof and a mating engagement section corresponding to the engagement section on the one objective, and wherein, when coupling both the objectives to each other, the taper section on the one objective is brought into line contact with the cylindrical bore on the other objective to define an engagement circle, and the engagement section on the one objective is engaged with the mating engagement section on the other objective to define at least one power transmission point in a bisector plane including the engagement circle.

When the taper section on the one objective is engaged with the cylindrical bore on the other objective, both the objectives are held by each other to define the engagement circle. Since the power transmission point defined by the engagement between the engagement section on the one objective and the mating engagement section on the other objective exists in the bisector plane including the engagement circle, it is possible to transmit a uniform velocity between the objectives.

BRIEF DESCRIPTION OF THE DRAWINGS

These and other objects of the present invention will become apparent from the following detailed description of the preferred embodiment of the invention, taken in connection with the accompanying drawings.

In the drawings.

DESCRIPTION OF THE PREFERRED EMBODIMENTS

Preferred embodiments of the present invention will be described below with reference to the attached drawings.

Figure 1:
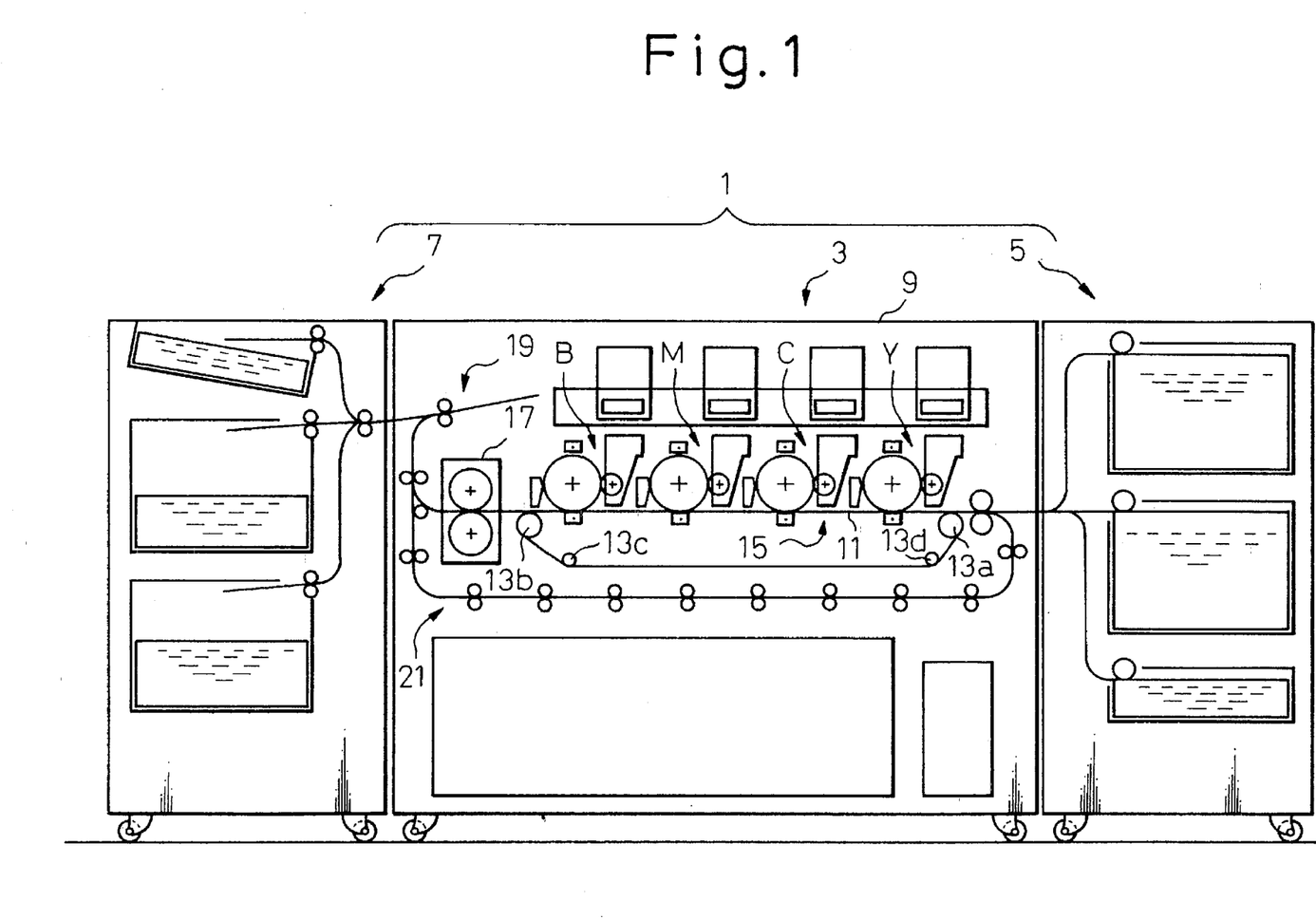
FIG. 1 diagrammatically illustrates a whole structure of one embodiment of a multicolor image recording apparatus incorporating a photo-sensitive drums according to the present invention.

FIG. 1 schematically illustrates a whole structure of a multicolor image recording apparatus in which a transmission/coupling device according to the present invention is incorporated between a photo-sensitive drum and a drive unit. In the drawing, the image recording apparatus 1 basically consists of three box-like zones; a recording zone 3 of a multi-drum type for carrying out a full color recording with multicolors at a high speed, a sheet-feeding zone 5 (right side in FIG. 1) for feeding recording sheets to the recording zone 3, and a delivery zone 7 (left side in FIG. 1) for receiving the recorded sheets delivered from the recording zone 3. The sheet-feeding zone 5 has three sheet cassettes arranged so that one is above the other, in each of which is stored a stack of sheets of an individual size. The delivery zone 7 has three delivery trays arranged so that one is over the other, in each of which can store a stack of recorded sheets.

The recording zone 3 is adapted to minimize the installation area (projected area) thereof by reducing overall dimensions so that an office space or other can be effectively used. That is, the recording zone 3 includes a main frame 9 and four image-forming units Y, C, M and B of substantially the same structure accommodated within the main frame, for recording a yellow toner image, a cyan toner image, a magenta toner image and a black toner image, respectively, on the recording sheet. These image-forming units are arranged parallel to each other at a predetermined distance therebetween in a horizontal plane defined at a middle position of the main frame 9. At a position in the main frame 9 distant downward from the image-forming units are arranged a conveyor device 15 consisting of an endless belt 11 made of resin capable of electro-statically attracting the sheet and four rollers 13a through 13d, around which is wrapped the endless belt 11. On the downstream side of the conveyor device 15, a fixing device 17 is provided for thermally fixing the transferred toner images on the recording sheet passing through a transfer process. On the downstream side of the fixing device 17, a delivery device 19 (which is composed of a plurality of roller pairs for nipping and conveying the recorded sheet) is provided for transferring the recorded sheet to the delivery zone 7. To carry out double-sided recording, a reversing device 21 (which is composed of a plurality of roller pairs) is coupled to the delivery device 19, for returning the recording sheet passing through the image-forming units upstream while reversing the same by using a switch-back system.

Figure 2:
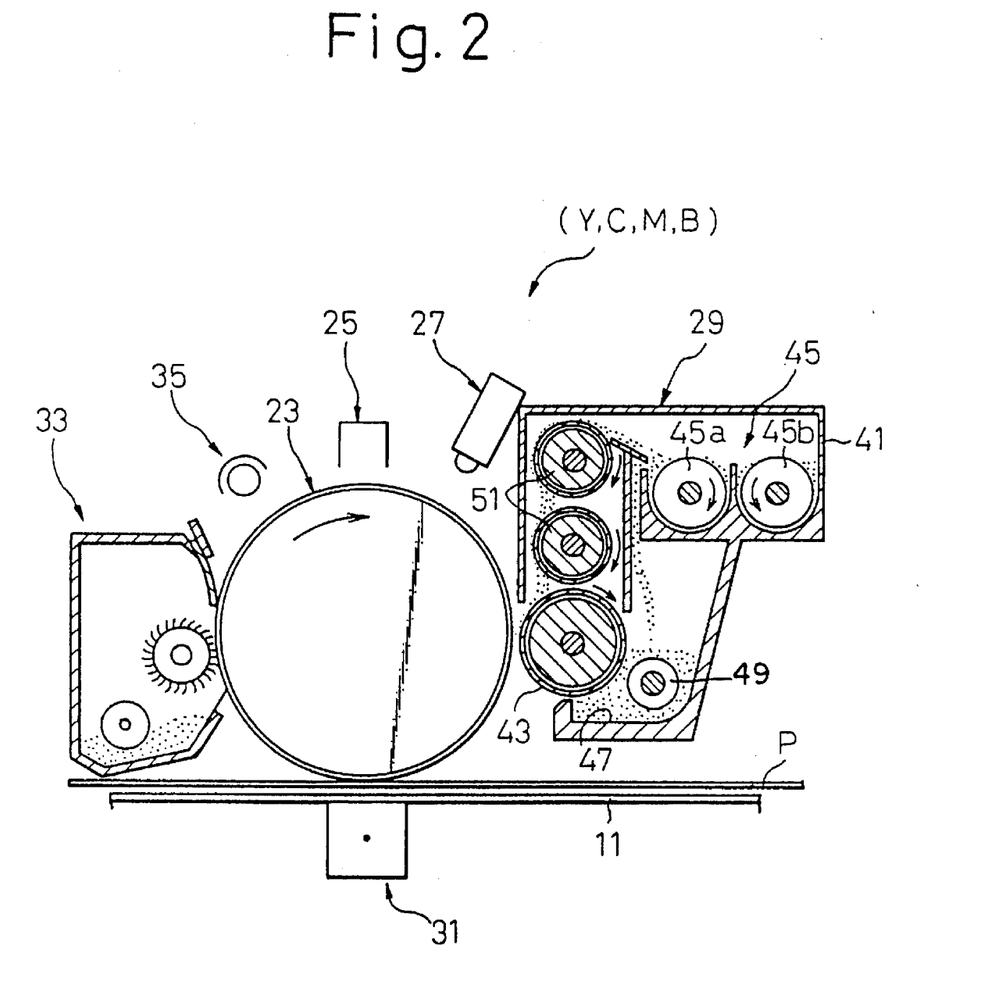
FIG. 2 is a sectional view schematically illustrating an individual image-forming unit.

As shown in FIG. 2 which is a schematic illustration of the individual image-forming unit, the respective image-forming units Y, C, M or B include a photo-sensitive drum 23, a precharging device 25 (such as a corona charger, a scorotron charger, a conductive roller type charger or a conductive brush type charger), an optical writing device 27 (such as a laser beam scanner, an LED array or a liquid crystal shutter array), a developing device 29, a transfer device 31 (such as a conductive transfer roller), a cleaning device 33 for removing residual toner on the photo-sensitive drum, and a discharger lamp device 35 for discharging the photo-sensitive drum 23.

The respective developing device 29 includes a developer container 41, a developing roller 43 partially exposed from the developer container 41 and disposed opposite to the photo-sensitive drum 23 so that a magnetic brush is formed on the outer periphery thereof, an agitator 45 consisting of a pair of conveyor rollers 45a, 45b having an agitating/conveying screw blade (not shown in detail) for frictionally charging a toner component and a magnetic carrier component of a bi-component developer and disposed parallel to the developing roller 43, a developer reservoir 47 for receiving the developer overflowing from the agitator 45, a paddle roller 49 for supplying the developer in the developer reservoir 47 to the developing roller 43, and a pair of magnetic rollers 51 for raising the developer exiting from the developing zone (having an exhausted toner component) upward to the agitator 45. Developers containing, respectively, a yellow toner component, a cyan toner component, a magenta toner component and a black toner component are suitably supplied from the respective toner tanks (not shown) to the respective developing devices 29.

The operation of the recording zone 3 will be explained with reference to FIG. 2. The surface of the photo-sensitive drum 23 is sequentially and uniformly charged by the recharger 25 to form a charged area wherein an electro-static latent image is then formed by the optical writing device 27. The electro-static latent image on the photo-sensitive drum 23 is developed in an electro-static manner by the developing device 29 as a charged toner image which is then transferred to a recording sheet (recording medium) P fed from the sheet-feeding zone 5 (see FIG. 1) onto the endless belt 11 by the transfer device 31. A yellow toner image, a cyan toner image, a magenta toner image and a black toner image are sequentially transferred onto the recording sheet as the same sequentially passes through the four image-forming units Y, C, M and B. Since the four color-toner images are overlapped with each other or a plurality of different color dots are formed in a predetermined area, a multicolor image can be formed, which consists of a number of different colors more than the number of the image-forming units. Thereafter, the recorded sheet P is fed to the fixing device 17 (see FIG. 1) so that the full color image is thermally fixed thereon.

Accordingly, if the toner images do not positionally coincide with each other, the overlapped positions or the dot positions are diverge from each other to form colors different from the expected ones. To solve such an inconvenience, it is necessary to manufacture and/or assemble the apparatus for carrying out multicolor printing at a higher accuracy than that necessary for the apparatus for carrying out monochrome printing.

Figure 3:
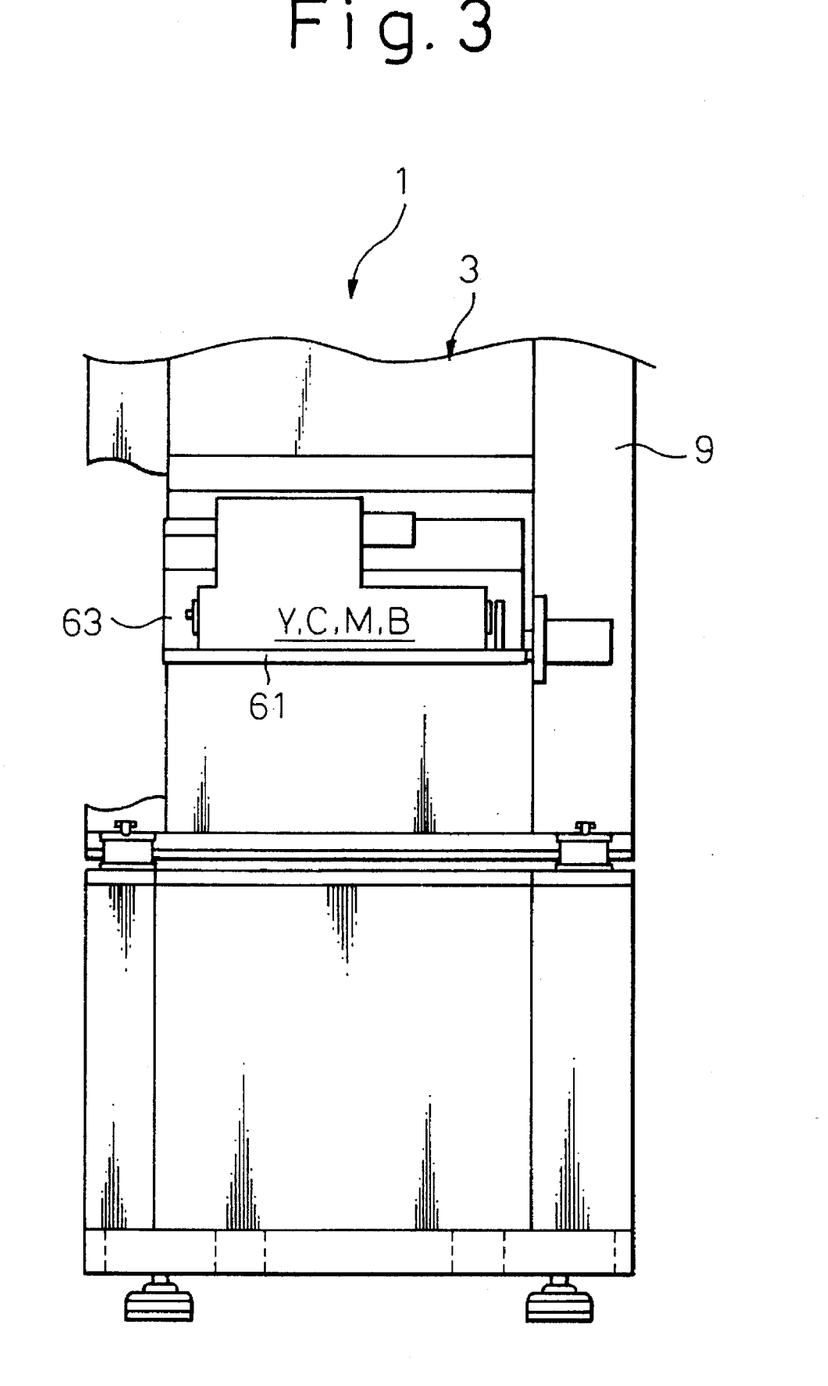
FIG. 3 illustrates a state of the image-forming unit accommodated in the recording zone as seen on the sheet-feeding zone side.
Figure 4:
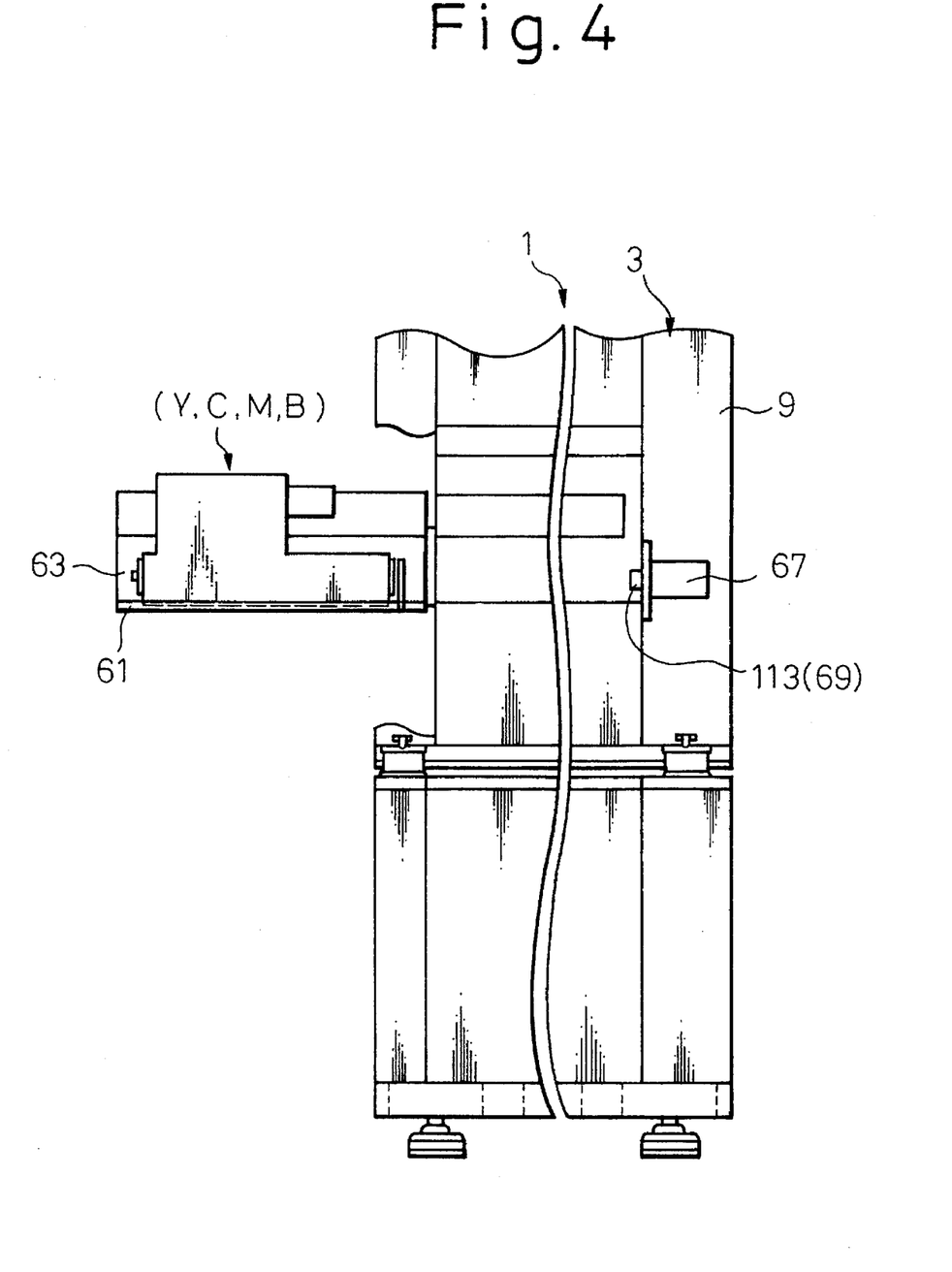
FIG. 4 illustrates a state of the image-forming unit drawn out from the apparatus as seen on the sheet-feeding zone side.
Figure 5:
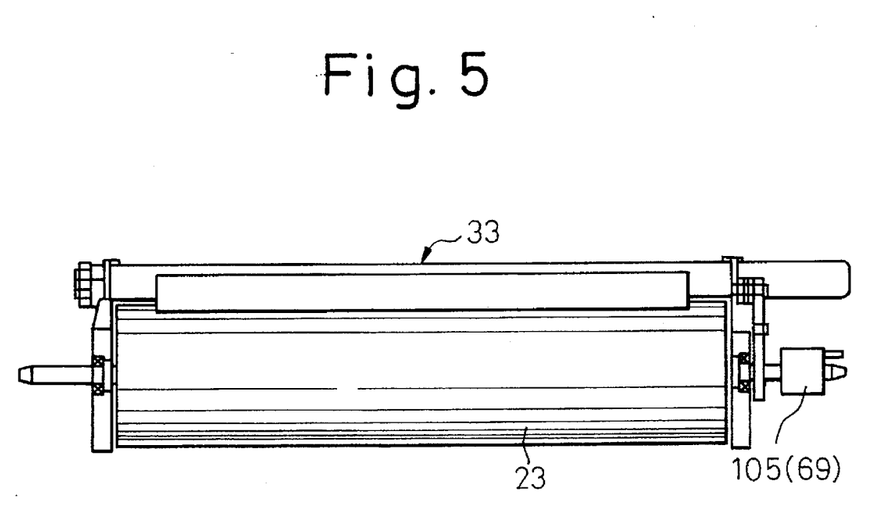
FIG. 5 is a plan view of the removed photo-sensitive drum.

Guiding mechanisms (not shown) are provided on both side of the main frame 9 of the recording zone 3, through which a subframe 61 (not shown in detail) can be drawn out to the operator side. The four image-forming units Y, C, M and B are mounted onto the subframe 61 so that all the four units can be simultaneously drawn out of the apparatus. Also, each of the image-forming units is mounted onto a slide frame 63 slidably carried on the subframe 61 to be capable of being individually drawn out to the operator side. FIG. 3 shows a state wherein all of the image-forming units Y, C, M and B are accommodated within the apparatus, and FIG. 4 shows a state wherein at least one of the image-forming units is drawn out to the operator side. FIG. 5 shows the photo-sensitive drum 23 removed from the withdrawn image-forming drum, to which is integrally attached the cleaning device 33 or others. When the image-forming unit is accommodated within the interior of the apparatus as shown in FIG. 3, an operator side shaft end (righthand in FIG. 5) is rotatably supported by a bearing (not shown) provided on the slide frame 63, while the opposite side shaft end is coupled to an output shaft of a drive motor 67 provided on the main frame 9 via a transmission/coupling device 69 (described later in detail), whereby the photo-sensitive drum 23 is accurately driven to rotate while being positioned with a high precision. On the other hand, when the image-forming unit is drawn out via the slide frame 63 as shown in FIG. 4, the operator side shaft end of the photo-sensitive drum 23 is held by the slide frame 63 as it is, while the opposite shaft end is released from the coupling to the output shaft of the drive motor 67, which instead is held by a supporting portion (not shown) of the slide frame 63 directly or indirectly in a relatively rough manner. The photo-sensitive drum 23 can be readily removed in this latter state. As stated above, since the image-forming units Y, C, M and B can be drawn out, it is possible to easily and quickly carry out the maintenance such as the replacement of parts, which mitigates the load on the operator to a great extent.

Figure 6:
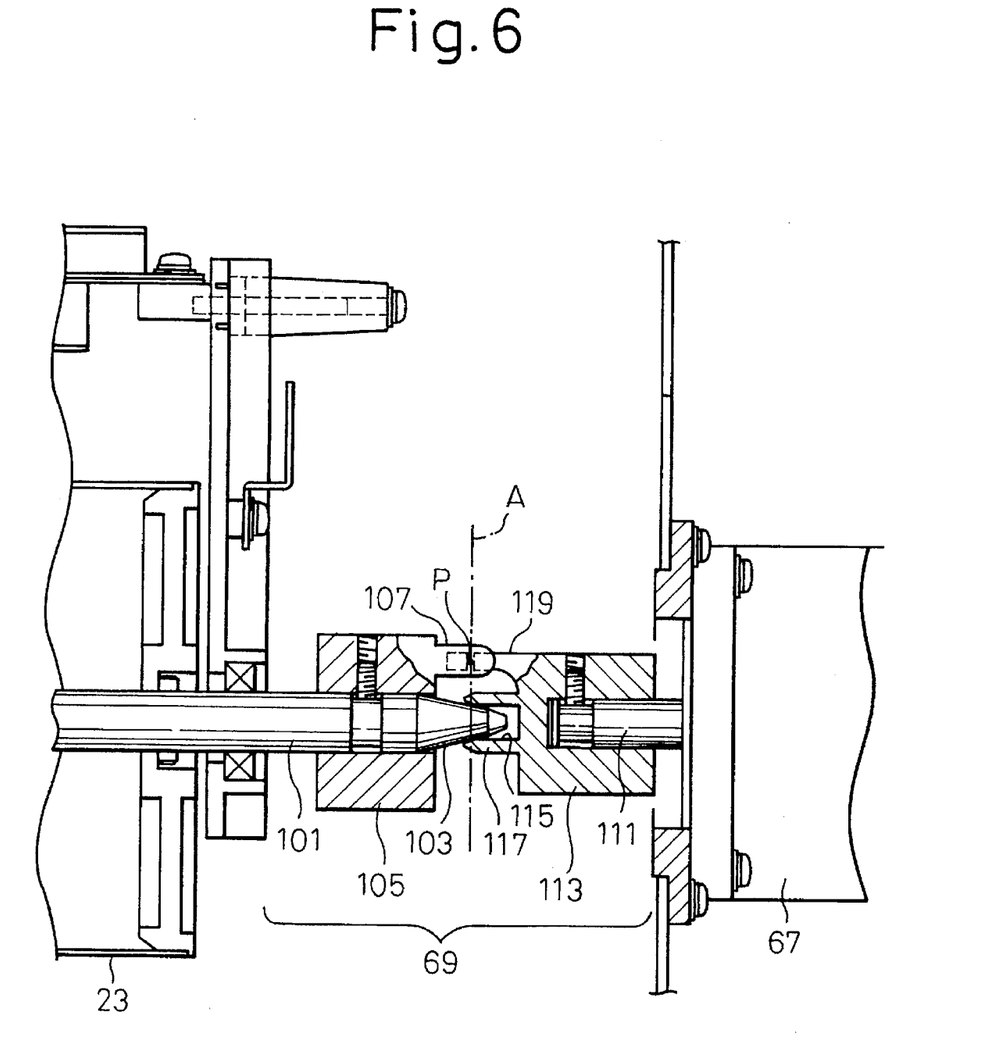
FIG. 6 is a side sectional view of a transmission/coupling device according to a first embodiment of the present invention.

The transmission/coupling device 69 referred to above will be described in more detail with reference to FIG. 6. On a shaft 101 of the photo-sensitive drum 23, a taper section 103 is formed at an outer end thereof, and a first coupling member 105 of a cylindrical shape is mounted at a position inner from the taper section 103 and fixed on the shaft 101 by a set screw. The first coupling member 105 has a projection (engagement section) 107 extending parallel to the axis at a predetermined position in an outer area of an end surface thereof. On the other hand, on an output shaft 111 of the drive motor 67, a second coupling member 113 of a cylindrical rod shape is mounted to be opposite to the first coupling member 105 and fixed to the output shaft 111 by a screw. The second coupling member 113 has a cylindrical tubular section 117 extending in the axial direction with a cylindrical bore 115 at a central area of an end surface thereof and a projection (mating engagement section) 119 extending parallel to the axis at a predetermined position in an outer area of the end surface.

Upon coupling, the photo-sensitive drum 23 is axially pushed to the drive motor 67 to insert the taper section 103 of the shaft of the photo-sensitive drum 23 into the cylindrical bore 115 of the cylindrical tubular section 117 of the second coupling member 113 provided at the end of the output shaft of the drive motor 67 so that a line contact is obtained between the two to define an engagement circle. The projection 107 of the first coupling member 105 on the shaft 67 of the photo-sensitive drum 23 is brought into contact with the projection 119 of the second coupling member 113 at one point which defines a power transmission point P. A bisector plane A (depicted by a chain line in FIG. 6) including the engagement circle is vertical to the axis of the output shaft 111 of the drive motor 67. Accordingly, even if the photo-sensitive drum 23, and thus the shaft 111 thereof, angularly deviates during the rotation, the engagement circle is always maintained invariable between the taper section 103 and the cylindrical bore 115 and the bisector plane A also remains in its vertical position. In the bisector plane A, the engagement point exists between the projection 107 of the first coupling member 105 and the mating projection 119 of the second coupling member 113 and defines the power transmission point P. Thus, even if the photo-sensitive drum 23 (shaft 101) angularly deviates in operation, the power transmission point P always exists in the bisector plane A.

As stated above, according to the transmission/coupling device of the present invention, it is possible to correctly hold the photo-sensitive drum, particularly of a replaceable type, in a stable manner without generating a play in the coupling portion thereof. Also, since the power transmission point exists in the bisector plane A, a so-called uniform velocity transmission is possible. According to this uniform velocity transmission, the positional and/or color offset of the printed image can be avoided. Also, the coupling and decoupling states can be easily and quickly obtained by moving the photo-sensitive drum forward and backward. Further, the device according to the present invention is simple in structure and can be manufactured at a low cost.

Figure 7:
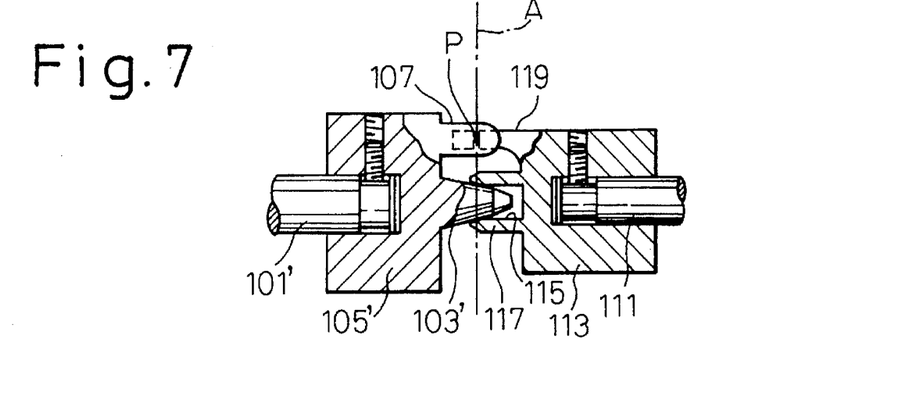
FIG. 7 is a side sectional view of a modification of the first embodiment.

In the first embodiment described above, while the taper section 103 of the shaft 101 of the photo-sensitive drum 23 is used as one component, it is possible to modify the device, as shown in FIG. 7, so that a shaft 101' has no taper section but a first coupling member 105' has a taper section 103' at a center of the front surface thereof. By using such a coupling structure, the machining operation, for forming the taper section on the shaft of the photo-sensitive drum can be omitted, resulting in the cost reduction. This embodiment can be applied to various fields wherein the coupling of two shaft portions is required, without the necessity for machining the shaft. Accordingly, a wider application of this coupling device will be expected.

Figure 8:
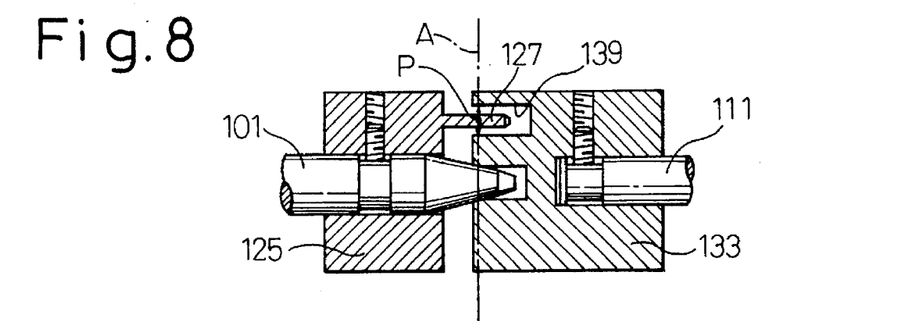
FIG. 8 is a side sectional view of a transmission/coupling device according to a second embodiment of the present invention.
Figure 9:
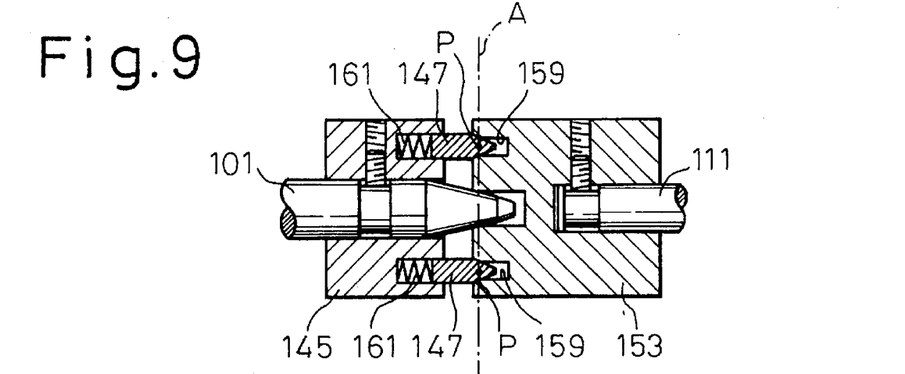
FIG. 9 a side sectional view of a transmission/coupling device according to a third embodiment of the present invention.

In FIGS. 8 and 9, parts or components common to those of the first embodiment are denoted by the same reference numerals and the explanation thereof will be omitted for the purpose of simplicity.

According to a second embodiment shown in FIG. 8, similarly to the first embodiment, a taper section is formed at an end of a shaft 101 of a photo-sensitive drum and engaged with a cylindrical bore of a second coupling member to define an engagement circle (bisector plane A). The difference from the first embodiment is in that, instead of the projection (engagement section) 107 of the first coupling member 105 and the projection (mating engagement section) 119 of the second coupling member 113, a first coupling member 125 has a shaped projection (engagement section) 127 of a generally rod-shape with a cutter-like portion having a larger diameter in a middle area, and a second coupling member 133 has a cylindrical recess (mating engagement section) 139 into which the cutter-like portion can be just fitted. According to the second embodiment, since an engagement zone; i.e., power transmission point P between the shaped projection 127 (cutter-like portion) and the recess 139 exists in the bisector plane A, the uniform velocity transmission can be achieved, basically similarly to the first embodiment.

FIG. 9 shows a third embodiment of the present invention wherein, similarly to the first embodiment, a taper section is formed at an end of a shaft 101 of a photo-sensitive drum and engaged with a cylindrical bore of a second coupling member to define an engagement circle (bisector plane A). The difference from the first embodiment is in that, instead of the projection (engagement section) 107 of the first coupling member 105 and the projection (mating engagement section) 119 of the second coupling member 113, a first coupling member 145 has a pair of taper projections (engagement sections) 147 located at positions symmetrical with each other relative to the rotary axis thereof, and a second coupling member 153 has a pair of cylindrical recesses (mating engagement sections) 159. Each of the projections 147 is biased by a compressive spring 161 built into the first coupling member 145 so that the engagement thereof with the recess 159 of the second coupling member 153 is maintained. According to the third embodiment, since two engagement zones; i.e., power transmission points P between the pair of projections 147 and the pair of recesses 159 exist in the bisector plane A, a uniform velocity transmission can be achieved, basically similarly to the first and second embodiments.

In this regard, the structure wherein no taper section is provided on the shaft of the photo-sensitive drum shown in FIG. 7 is also applicable to the second and third embodiments.

As described herein above, according to the present invention, it is possible to provide a transmission/coupling device capable of carrying out uniform velocity transmission and the quick coupling/decoupling of shafts.

It is to be understood that the invention is by no means limited to the specific embodiments illustrated and described herein, and that various modifications thereof may be made which come within the scope of the present invention as defined in the appended claims.

We claim:

1. A transmission/coupling device for coupling first and second coupling members, comprising:

said first coupling member including a taper section extending on a rotary axis thereof and an engagement section; and said second coupling member including a cylindrical bore section extending on a rotary axis thereof and a mating engagement section corresponding to the engagement section on the first coupling member, and wherein, when coupling both the first and second coupling members to each other, the taper section on the first coupling member is brought into a line contact with the cylindrical bore on the second coupling member to define an engagement circle, and wherein the engagement section on the first coupling member is engaged with the mating engagement section on the second coupling member to define at least one power transmission point in a bisector plane including the engagement circle.

2. An image-forming apparatus comprising:

at least one latent image carrier; and a transmission/coupling device for carrying out coupling/decoupling between the image carrier and a drive means corresponding thereto, wherein the transmission/coupling device comprises
(a) a taper section formed at an end of a shaft of the latent image carrier,
(b) a first coupling member mounted to the shaft and having an engagement section,
(c) a second coupling member mounted to an output shaft of the drive means and having a cylindrical bore on a rotary axis thereof and a mating engagement section, wherein, upon coupling, a line contact is formed between the taper section of the shaft and the cylindrical bore of the second coupling member, said line contact defining an engagement circle, and the engagement section of the first coupling member is engaged with the mating engagement section of the second coupling member to define at least one power transmission point;

the power transmission point being in a bisector plane including the engagement circle.

3. The image-forming apparatus as defined in claim 2, comprising a plurality of latent image carriers capable of forming visual images of different colors.

4. An image-forming apparatus comprising;

at least one latent image carrier; and a transmission/coupling device for carrying out coupling/decoupling between the latent image carrier and a drive means corresponding thereto, wherein the transmission/coupling device comprises
(a) a first coupling member mounted to a shaft of the latent image carrier and having a taper section on a rotary axis thereof and an engagement section, and
(b) a second coupling member mounted to an output shaft of the drive means and having a cylindrical bore on a rotary axis thereof and a mating engagement section, wherein, upon coupling, a line contact is formed between the taper section of the first coupling member and the cylindrical bore of the second coupling member, said line contact defining an engagement circle, and the engagement section of the first coupling member is engaged with the mating engagement section of the second coupling member to define at least one power transmission point;

the power transmission point being in a bisector plane including the engagement circle.

5. The image-forming apparatus as defined in claim 4, comprising a plurality of latent image carriers capable of forming visual images of different colors.

6. An image-forming apparatus comprising:

a plurality of latent image carriers on which latent images are formed with different colors; and a plurality of transmission/coupling devices for carrying out coupling/decoupling between the latent image carriers and drive means corresponding thereto, respectively, so that a multicolor image is formed on a transfer medium, wherein each of the transmission/coupling devices comprises
(a) a taper section formed at one end of a shaft of the latent image carrier,
(b) a first coupling member mounted to the shaft and having an engagement section, and
(c) a second coupling member mounted to an output shaft of the drive means and having a cylindrical bore on the rotary axis thereof and a mating engagement section, wherein, upon coupling, a line contact is formed between the taper section of the shaft and the cylindrical bore of the second coupling member, the line contact defining an engagement circle, and the engagement section of the first coupling member is engaged with the mating engagement section of the second coupling member to define at least one power transmission point;

the power transmission point being in a bisector plane including the engagement circle.

7. An image-forming apparatus comprising;

a plurality of latent image carriers on which latent images are formed with different colors; and a plurality of transmission/coupling devices for carrying out coupling/decoupling between the latent image carriers and drive means corresponding thereto, respectively, so that a multicolor image is formed on a transfer medium, wherein each of the transmission/coupling devices comprises
(a) a first coupling member mounted to a shaft of the latent image carrier and having a taper section on a rotary axis thereof and an engagement section, and
(b) a second coupling member mounted to an output shaft of the drive means and having a cylindrical bore on a rotary axis thereof and a mating engagement section, wherein, upon coupling, a line contact is formed between the taper section of the first coupling member and the cylindrical bore of the second coupling member, the line contact defining an engagement circle, and the engagement section of the first coupling member is engaged with the mating engagement section of the second coupling member to define at least one power transmission point;

the power transmission point being in a bisector plane including the engagement circle.

* * * * *